March 15, 1938.  C. F. HUDSON  2,111,473
COMBINATION AIR DISCHARGE AND VACUUM VALVE
Filed Dec. 19, 1935    2 Sheets-Sheet 1
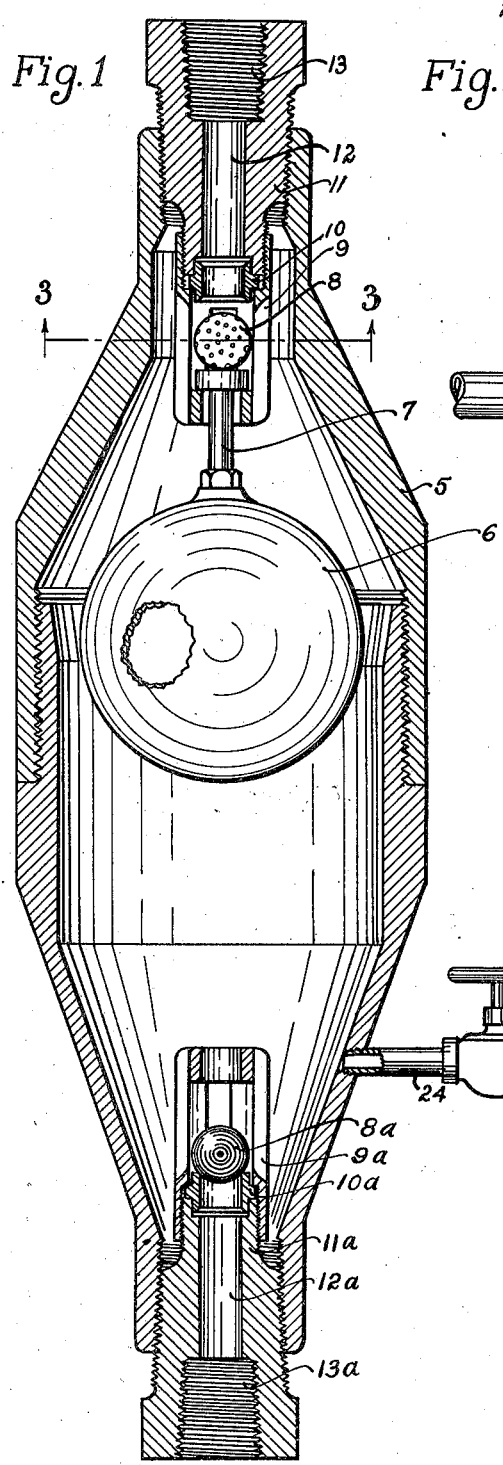
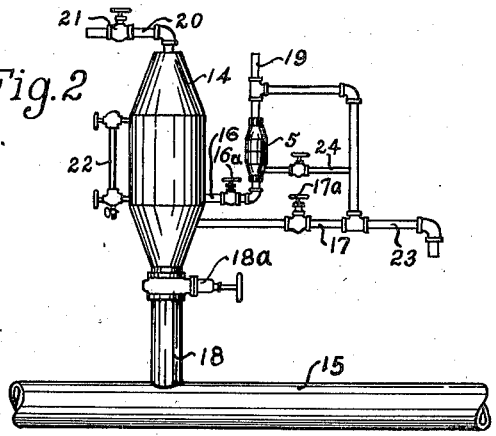
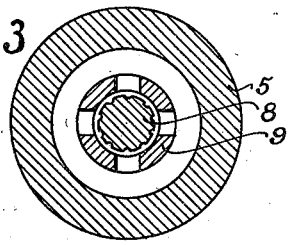
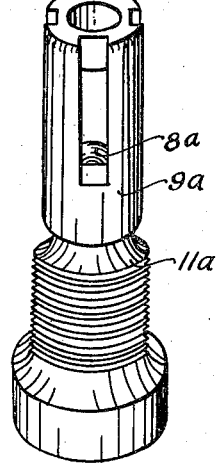
Charles F. Hudson
INVENTOR.
BY Van Buren Hillyard.
ATTORNEY.

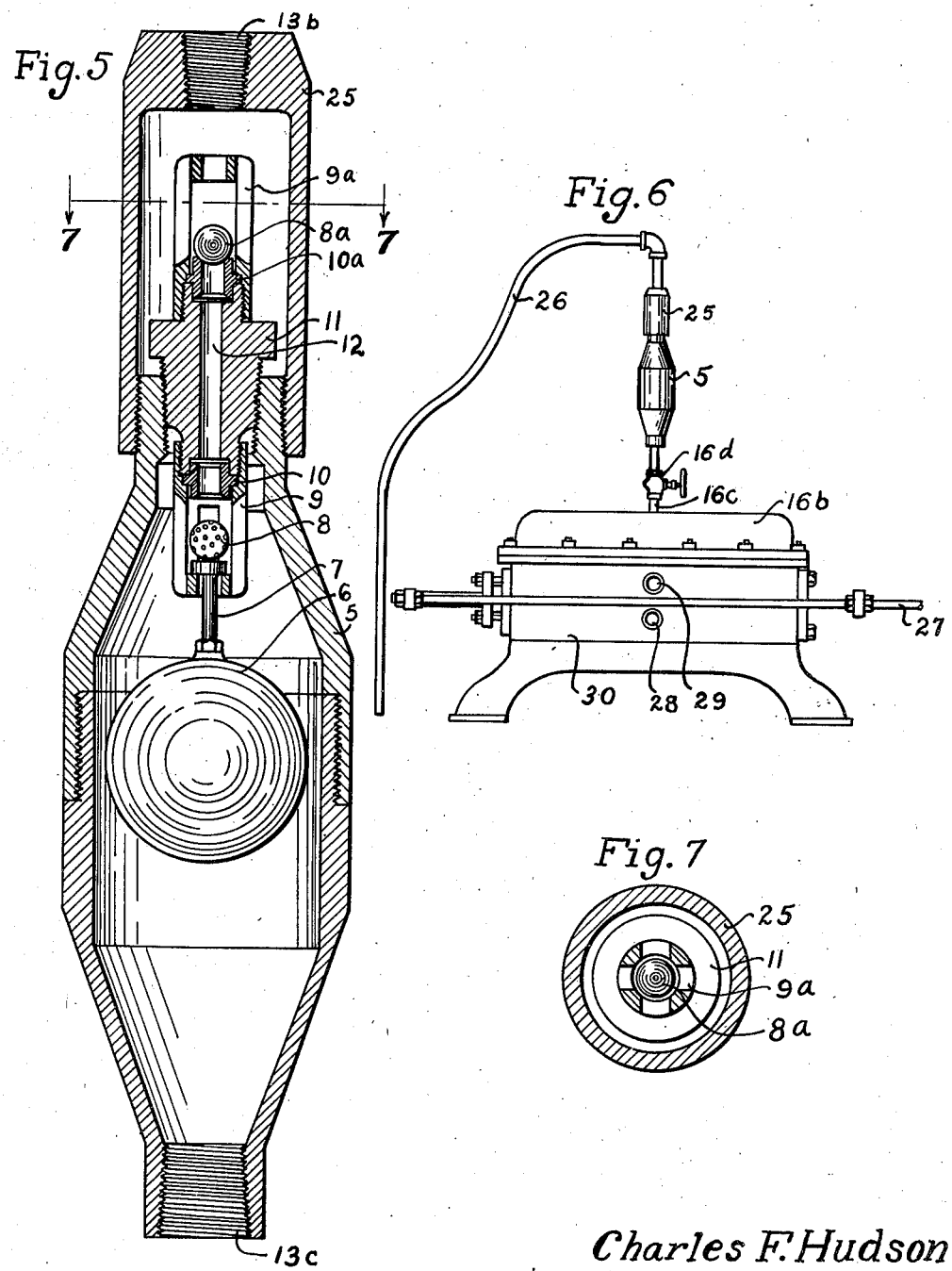
March 15, 1938.  C. F. HUDSON  2,111,473
COMBINATION AIR DISCHARGE AND VACUUM VALVE
Filed Dec. 19, 1935  2 Sheets—Sheet 2
Charles F. Hudson
INVENTOR.
BY Van Buren Hillyard.
ATTORNEY.

Patented Mar. 15, 1938

2,111,473

UNITED STATES PATENT OFFICE 2,111,473

COMBINATION AIR DISCHARGE AND VACUUM VALVE

Charles F. Hudson, Wichita Falls, Tex.

Application December 19, 1935, Serial No. 55,255

6 Claims. (Cl. 137—78)

This invention relates to improvements in combination air discharge and vacuum valves for pumps and pipe lines and the like.

An object of the invention is to provide a valve which will automatically release any air, vapor, gases, or steam that might become entrained in the fluid that flows through the pipe lines, or pumps, past said valve and which will, at the same time, prevent air entering the pipe line, or pump where the valve is attached, said valve requiring no attention or manual operation.

Another object of the invention is the provision of a valve that is adapted to be installed either on suction or discharge lines, or on pumps.

Still another object of the invention is to provide an automatic valve for the release of air, vapor, gases, or steam from pipe lines, or pumps, and which prevents surges of fluids in the pipe lines and obviates the pounding out of pump valves, valve seats, gaskets and other pump parts.

A still further object of the invention is the provision of an air release valve to be used on gathering pumps in the oil fields where one pump is pumping out a number of oil tanks that are on different ground elevations into pipe lines that transport the oil to its destination. As the higher tank is emptied some air is drawn into the pipe lines with the liquid causing an air lock within the line, or pump, thus preventing the pumps from emptying the oil from the tanks on the lower elevation. By the use of this automatic valve the air lock is automatically released and the oil flows unimpeded from all tanks. Daily oil shortages at the receiving stations are thus prevented as all tanks that are supposed to be emptied are emptied, obviating the necessity of using an excessive number of pumps to pump from each individual battery of tanks. This also saves expense and the time of the gauger because he does not have to go back and manually "bleed off" air from the lines, a process that wastes a large amount of oil.

Another object of the invention is the provision of a valve to be used on new pipe lines at high points to automatically release air locks, when testing the line, thus saving time, expense and trouble.

Still another object of the invention is the provision of a valve to be installed on suction lines so that the air will pass through the valve before it reaches the suction pumps. This enables air or gas that accumulates in the line to be discharged without reaching the pumps and allows tanks to be pumped to their lowest levels, thereby preventing the pumps becoming charged with air which would cause racing and damage to the pumps.

Still another object of the invention is the provision of a valve for feed water pumps that are required to handle preheated water before same is pumped into a boiler. This valve will automatically release all steam that might form around the pump valves which would block the pumping of the water through the pump into the boiler and thereby create the hazard of a low water level in the boiler.

Another object of the invention is the provision of an automatic valve to operate at oil refineries that are handling preheated oil in pumps. It will automatically eliminate the hazard of vapor locks in the oil line from which the oil is being pumped into high pressure oil stills. When a vapor lock occurs during the pumping of preheated oil, expensive shut downs and losses result.

It is to be understood that while the drawings illustrate a preferred embodiment of the invention, changes in the minor details may be resorted to to meet specific needs and requirements, within the scope of the appended claims, without departing from the spirit thereof.

With the foregoing objects in mind and others that will manifest themselves as the description proceeds, reference is to be had to the drawings hereto attached in which like reference characters designate like parts in the several views, in which:

Figure 1 is a central sectional view of the valve showing the air release and vacuum valve, together with operating float.

Figure 2 shows an installation of the valve on a pipe line air chamber.

Figure 3 is a section on the line 3—3 of Figure 1, showing valve cage and indented ball in section.

Figure 4 is a perspective view of the vacuum valve removed from the float chamber.

Figure 5 is a view similar to Figure 1, of a modification of the valve with both vacuum and air release valves above the float chamber.

Figure 6 shows an installation of the valve on a pump.

Figure 7 is a section taken on the line 7—7 of Figure 5, which shows the valve cage and cover in section.

With particular reference to the drawings, the numeral 5 designates the body of the float chamber, having a float 6 disposed therein, said float being attached to a slidable stem 7. An indented ball 8 rests upon the upper end of the stem 7 and is confined within a slotted cage 9 which retains a valve seat 10 in threaded bushing 11. A passage 12 extends through the bushing 11 to permit escape of air, vapor, gases, or steam. A threaded connection 13 provides means for attaching a pipe line to the valve when desired. This arrangement of valve provides a release for all air or gases but retains all liquids because the air will escape around the valve when the liquid will not. The ball 8 is provided with indentations in its surface to trap air therein when seated to prevent its sticking to the seat 10, the indentations being of sufficient multiplicity and of such size as to trap air therein preventing passage of air between the valve and its seat in any position of the valve. The air trapped between the valve and its seat overcomes any tendency of the valve to cling to its seat and permits the valve to fall away freely to leave an unobstructed outlet for the air, vapor, or gases.

The operation of the valve 8 is effected by fluid causing the float 6 to rise until the stem 7 pushes the indented ball 8 against the seat 10. When a suction is placed in a pipe line, the valve 8a, which is a common ball, seats upon a ground valve seat 10a, preventing air from being drawn into the line. A cage 9a screws to the bushing 11a and retains the ball 8a and valve seat 9a in place. A passage 12a extends through the bushing 11a and provides an outlet for air, vapor, gas and steam. A threaded connection 13a provides means for connecting the valve to a pump or pipe line.

Figure 2 illustrates a typical installation of automatic valve upon a pipe line. An air cushion chamber 14 is connected to the top of a pipe line 15 by a pipe 18 having a valve 18a. A pipe 16 connects the chamber 14 to the lower end of the automatic air valve 5, thereby permitting a constant fluid level to be maintained within the chamber 14. This also permits the escape or bleeding off of excess air which accumulates in the air chamber 14. A pipe 17 is connected to the lower section of the air chamber 14 for the purpose of drawing fluid from same. If the chamber 14 becomes full of liquid, due to leakage of air cushion, and it is desired to recushion the chamber 14, the valve 21 is opened to atmosphere and the valve 17a is opened to allow liquid to drain from the chamber 14. This permits air to enter the chamber to the desired pressure when both valves 21 and 17a are closed and the gate 18a opened. This allows the air valve 5 to resume operation and, at the same time, retain air cushion in the chamber 14.

Figure 5 is a modification utilizing the same valve principles as in Figure 1, except both valves 8 and 8a are above the liquid level. A valve of this construction permits the fluid to drain out of the float chamber 14 and admits of access to the valves and obviates the necessity of putting a drain line 24 from the float chamber 5.

Figure 6 shows an installation of the automatic air valve upon a pump thereby permitting the air to escape directly from the pump valve chamber 16b. The numerals 28 and 29 designate inlet and outlet pipes. A vent line 19 is provided from top of automatic air release valve, as shown in Figure 2.

In the modifications shown in Figures 5 and 6, a tight fitting cover 25 covers the ball and associated parts and has a pipe connection 26 to release vapors therethrough. A connection 13c is provided to attach automatic air valve to pump or pipe line.

Having thus described the invention, what is claimed is:

1. A valve comprising a valve seat having a passageway therethrough, and a reciprocating valve therefor, said valve having a plurality of surface indentations therein in portions adapted to engage the seat, each of said indentations being of smaller diameter in all directions than the width of the seating portion of the valve seat axially of the valve seat passageway to trap air therein when the valve is seated.

2. A valve comprising a valve seat, and a ball valve therefor, said seat having a seating surface approximately fitting the contour of the ball valve, said ball valve having a multiplicity of minute surface indentations therein, each of said indentations being of smaller diameter than the width of the seating surface to trap air therein when the ball valve is seated but preventing passage of fluid therethrough.

3. A valve comprising a valve seat having a passageway therethrough, and a valve therefor movable axially of the passageway relative to the valve seat, said valve seat and valve having engaging surfaces, at least one of which surfaces has a plurality of surface indentations therein, each of said identations being of a smaller diameter in all directions than the width of the engaging surface of the valve seat to trap air therein when the valve is seated.

4. A valve comprising a valve seat, and a reciprocating valve therefor, said valve seat and valve having complementary engaging surfaces, at least one of which surfaces has a multiplicity of minute surface indentations therein, each of said indentations being of a smaller diameter than the width of the engaging surface of the valve seat to trap air therein when the valve is seated but preventing passage of fluid therethrough.

5. The combination with an oil pipe line system having an air cushion chamber connected therewith, of an air discharge valve having a chamber in communication with the air cushion chamber to permit oil to rise in said valve chamber, and means responsive to the rise of oil in said valve chamber for preventing the outflow of oil externally of said chamber while permitting the escape of gaseous fluid therefrom.

6. The combination with an oil pipe line system having an air cushion chamber in communication therewith, of an air discharge valve having a chamber in communication with the air cushion chamber permitting a rise of oil therein, a check-valve in the lower portion of said air discharge chamber to prevent back flow of oil therethrough, means for draining oil from the lower portion of said valve chamber, and means responsive to the rise of oil in said valve chamber for preventing the outflow of oil externally thereof, while permitting the escape of gaseous fluid from the oil pipe line system and air cushion chamber through the valve chamber.

CHARLES F. HUDSON.